United States Patent [19]

Niskanen

[11] Patent Number: 4,633,961
[45] Date of Patent: Jan. 6, 1987

[54] POWER TRANSMISSION ARRANGEMENT IN A TRACTOR

[75] Inventor: Hannu Niskanen, Jyväskylä, Finland

[73] Assignee: Valmet Oy, Finland

[21] Appl. No.: 816,621

[22] Filed: Jan. 6, 1986

[30] Foreign Application Priority Data

Jan. 9, 1985 [FI] Finland .................................. 850108

[51] Int. Cl.⁴ ...................... B60K 25/02; B60K 17/35; F16H 37/00
[52] U.S. Cl. ................................ 180/53.7; 123/198 R; 74/15.63; 180/240
[58] Field of Search ...................... 180/53.1, 53.7, 240; 123/198 C, 196 R, 198 R; 60/464; 74/15.63

[56] References Cited

U.S. PATENT DOCUMENTS

| | | | |
|---|---|---|---|
| 2,821,868 | 2/1958 | Gregory | 180/53.7 |
| 2,857,009 | 10/1958 | Adams et al. | 180/53.7 |
| 2,866,510 | 12/1958 | Flamm | 180/53.7 |
| 4,530,338 | 7/1985 | Sumi | 123/198 R |

Primary Examiner—John J. Love
Assistant Examiner—Karin L. Ferriter
Attorney, Agent, or Firm—Steinberg & Raskin

[57] ABSTRACT

An improvement in a power transmission arrangement in a four-wheel drive tractor which includes an engine, an oil sump containing a reservoir of lubricant for the engine and wherein power is transmitted from the tractor gearbox or from a separate power take-off gearbox to the differential gear of the front axle by a power transmission member. A power take-off shaft is provided at the front end of the tractor for transmitting power from the engine crankshaft to external equipment. According to the invention, the differential gear of the front axle, the four-wheel drive clutch which couples the transmission member to the front axle differential gear, at least part of the take-off shaft clutch and other transmission elements for the take-off shaft, and the hydraulic steering pump are situated within the oil sump. The invention further includes operating the four-wheel drive clutch and the differential lock thereof, and the take-off clutch by means of the engine lubricant contained in the oil sump. The components of the power transmission arrangement situated within the oil sump are at least partly supported on the oil sump which is arranged to act as a load carrying component of the tractor frame.

7 Claims, 2 Drawing Figures

POWER TRANSMISSION ARRANGEMENT IN A TRACTOR

BACKGROUND OF THE INVENTION

The present invention relates generally to power transmission arrangements for tractors.

More particularly, the invention relates to the power transmission arrangement in a four-wheel drive tractor wherein power is transmitted from the tractor gearbox or from a separate power take-off gearbox to the differential gear of the front axle by means of a cardan shaft or similar power transmission member and wherein the tractor is provided at its front end with a power take-off shaft for transmitting power from the engine crankshaft to external equipment.

The power transmission arrangement of a conventional four-wheel drive tractor is generally adapted to transmit power from the engine, situated at the front end of the tractor, through a drive clutch and a cardan shaft or clutch shaft to the gearbox situated at the rear end of the tractor. The gearbox may be situated in the same housing along with the drive gear of the rear wheels. The gearbox may be provided with a clutch and with a power take-off for the four-wheel drive, or with a separate take-off box, from which power is transmitted through a cardan shaft to the drive gear of the front axle. The front axle is usually a pivoted or swinging axle which is mounted on the tractor frame and normally comprises a rigid, hollow axle housing in which the drive gear is installed.

A general drawback of a swinging axle is that not much room is available within which the axle can tilt since, upon tilting, the axle soon comes into contact with the tractor frame. Moreover, in the particular case of four-wheel drive tractors whose front wheels are usually relatively large, tilting of the front axle may cause the wheels to come into contact with the engine housing. When the housing is tilted, the wheels are of course also tilted which reduces the grip and tractive capacity of the wheels.

In order to improve the traction and grip of the front wheels, a differential lock or so-called "limited slip" type friction lock may be used in connection with the differential gear of the front axle. Generally, a hydraulic or electrically operated positive lock cannot be used on the front axle because the hoses and wires will tend to follow the profile of the terrain over which the tractor moves so that in the case of rough and uneven terrain, the hoses and wires can be broken. Moreover, hydraulic locks frequently have small oil leaks and any oil leakage would eventually find its way into the axle housing and possibly result in damage to the axle seals.

In tractors provided with power take-off means at the front end of the tractor, the arrangement is such that the power is obtained from the engine crankshaft by means of a cardan shaft coupled to a separate reduction gear of the power take-off transmission which is provided with a power take-off shaft. The reduction gear of the power take-off transmission arrangement is normally situated in a separate housing which also contains the clutch for the power take-off transmission arrangement. The clutch normally comprises a dry friction clutch although so-called oil bath clutches may also be used. One of the drawbacks of a separate power take-off gearbox is that it requires an oil location which is separate from the other parts of the tractor which again results in additional points on the tractor which require servicing and which may constitute a point of oil leakage.

SUMMARY OF THE INVENTION

Accordingly, it is an object of the present invention to provide a new and improved power transmission arrangement for a tractor which is not subject to the drawbacks described above.

Briefly, in accordance with the present invention, these and other objects are attained by providing a power transmission arrangement wherein each of the differential gear of the driving front axle, the four-wheel drive clutch which couples the transmission member to the front axle differential gear, at least a substantial part of the coupling and power transmission equipment for the take-off shaft, and the hydraulic steering pump, is situated within the oil sump which acts as the oil reservoir of the engine.

Several important advantages are obtained by the invention which are not obtained by conventional power transmission arrangements. For example, by positioning the power transmission components in the same oil location, i.e., in the oil sump, the number of possible oil leakage points is reduced. Moreover, the same engine lubricant oil can be used both as the engine lubricant as well as the drive medium for the transmission components. This feature provides a fundamental improvement in the serviceability of the tractor.

Moreover, the invention provides the capability of using conventional suspension members, known from automotive technology, for the suspension of the front wheels of the tractor so that when driving over rough terrain, the position and angles of tilt of the front tractor wheels will remain as desired at all times thereby improving the grip of the wheels and the tractive capacity of the tractor. The invention provides the ability to arrange the suspension of the front wheels in a simple manner. For example, the invention allows for the possibility of providing brakes for the front wheels. Indeed, several countries require the front axle be provided with spring suspension and brakes on the fourwheels as a prerequisite for increased maximum permitted constructional speed of the tractor.

DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENTS

Figure 1:
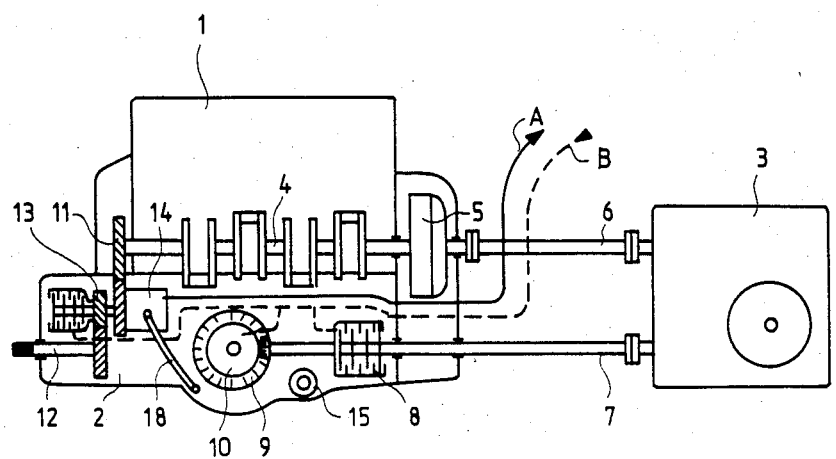
FIG. 1 is a schematic side view of a power transmission arrangement in accordance with the invention.

Referring now to the drawings wherein like reference characters designate identical or corresponding parts throughout the several views, a schematic view of a power transmission arrangement for a four-wheel drive tractor is shown in FIG. 1. The engine 1 of the tractor is situated at the front end of the tractor and the gearbox 3 is situated in the rear end of the tractor near the rear axle. Power is transmitted from the crankshaft 4 of engine 1 through the drive clutch 5 and a clutch shaft 6, which may for example comprise a cardan shaft, to the gearbox 3.

In the illustrated embodiment, the take-off shaft for the four-wheel drive comes from gearbox 3 and is coupled to the front axle by means of a transmission member, such as a cardan shaft 7. It is understood that a separate take-off box may be provided in connection with the gearbox 3 from which power is transmitted by means of the cardan shaft 7 to the front axle of the tractor.

In accordance with the improvement of the invention, the drive gear of the front axle including the differential gear 9 is situated within the oil sump 2 of engine 1. The four-wheel drive clutch 8 which couples the transmission member 7 to the front axle differential gear 8 is also situated within the oil sump 2. This is contrasted with conventional arrangements wherein the four-wheel drive clutch is situated at or near the gearbox 3 and wherein a hydraulic multiple-plate clutch or a simple claw clutch is used. However, in accordance with the invention, the four-wheel drive clutch 8 comprises a hydraulically operated oil-bath type disc clutch, and preferably a multiple-disc clutch. In accordance with the invention, it is advantageous to provide the differential gear 9 of the front axle with a differential lock 10 which is also situated within the oil sump 2. The differential lock 10 of the front axle preferably comprises a hydraulically operated disc clutch of the multiple-plate type, similar to the four-wheel drive clutch 8.

The power transmission arrangement of the invention also includes a power take-off shaft 12 situated at the front of the tractor. Power is transmitted to the shaft 12 from engine crank shaft 4 through suitable power transmission members 11 and clutch devices 13. In the illustrated embodiment, the power transmission members 11 comprise a gear drive. However, it is understood that the power may be transmitted by other conventional arrangements, such as by means of a chain drive. The clutch 13 of the front power take-off shaft is preferably a multiple-disc clutch similar to that used as the differential lock 10 and as the four-wheel drive clutch 8.

In the power transmission arrangement of the invention, a hydraulic pump 14 is operatively associated with the front power take-off transmission members 11, the hydraulic pump 14 functioning as the steering pump. A tractor in accordance with the invention is provided with hydrostatic steering as is generally the case in modern tractors. An operating fluid line A comprises the output of the steering pump 14 so that operating fluid line A delivers the operating fluid under pressure from steering pump 14. The high pressure operating fluid line A is connected to a steering valve (not shown) which itself is connected with the steering wheel of the tractor.

The steering pump 14, the front power take-off clutch 13 and at least the major part of the power transmission arrangement 11 of the front power take-off are situated within the oil sump 2 in the same oil space as the front axle differential gear 9 and the differential lock 10 and the four-wheel drive clutch 8.

In accordance with another feature of the invention, the oil lubricant of the engine 1 contained in oil sump 2 is used as the operating or drive fluid for the steering pump 14 and the same oil lubricant is also used for controlling clutches 8 and 13 as well as the differential lock 10. Thus, clutches 8 and 13 as well as differential lock 10 are coupled to the engine lubricant contained in the oil sump 2 by a low pressure operating fluid return line B. Thus, the return flow of the oil lubricant is passed to these components from the steering valve by way of appropriate valves. The intake side of the hydraulic pump 14 is coupled to an intake pipe 18 whose inlet end is positioned close to the bottom of the oil pump 2.

According to another feature of the invention, the oil sump 2 is advantageously designed as a strong structural member so that it functions not only to contain the engine lubricant oil but, additionally, as a load bearing component of the tractor frame. When this feature is utilized, the front axle differential gear 9 and its differential lock 10, the four-wheel drive clutch 8, the coupling and power transmission members 11, 12, 13 of the front power take-off and the steering pump 14 are mounted for support, either exclusively or at least in part, on the oil sump 2. In accordance with another desirable feature of the invention, the steering pump 14 and the clutch 13 of the front power take-off are mounted on the same shaft which, in the illustrated embodiment, also functions as the intermediate shaft of the front power take-off.

Figure 2:
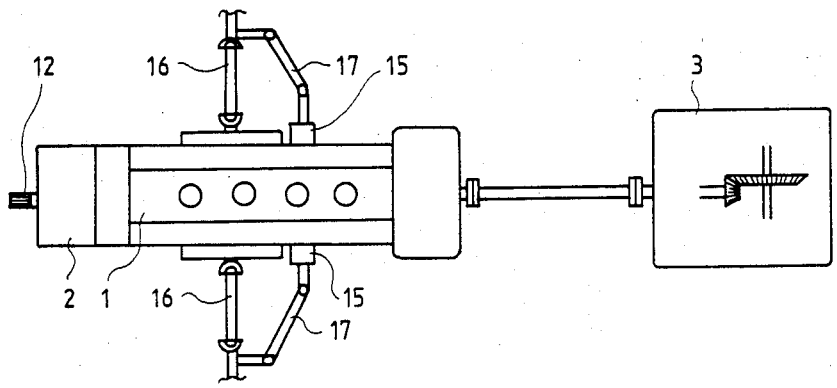
FIG. 2 is a top view of the power transmission arrangement shown in FIG. 1.

Referring to FIG. 2 in conjunction with FIG. 1, the steering cylinders 15 of the front wheels of the tractor are also situated within the oil sump 2. Moreover, the steering cylinders 15 are rigidly supported on the oil sump 2. Since the drive gear of the front axle including the front axle differential gear 9 is fixed on the oil sump 2, the suspension of the front axle cannot be accomplished in the manner of a conventional swing axle. For this reason, in accordance with the invention, conventional automotive suspension members are used in the suspension of the front wheels of the tractor and the drive can be transmitted from the drive gear to the front wheels, such as by means of articulated shaft 16. Steering of the front axle may also be accomplished by means of a separate systems of rods 17 extending from the steering cylinders 15 to the front wheel.

A power transmission arrangement in accordance with the invention and constructed as shown in FIGS. 1 and 2 makes it possible to provide the front wheel suspension with a spring action similar to that used in automotive technology and having the advantages of providing spring action over rough terrain as described above. When the tractor wheels are provided with a suspension in accordance with conventional automotive technology, the angles of tilt of the front wheels can be confined more accurately within specified limits thereby providing the advantages discussed above.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. In a four-wheel drive tractor including an engine having a crankshaft and an oil sump containing a reservoir of lubricant for said engine, a power transmission arrangement including power take-off shaft means for transmitting power from said engine crank shaft to external equipment, first transmission means and take-off shaft clutch means for transmitting power from said engine crank shaft to said take-off shaft means, a driving front axle, a differential gear of said front axle, said front axle differential gear having a differential lock, second transmission means for transmitting power from one of a tractor gearbox and a separate take-off gearbox to said front axle differential gear, four-wheel drive clutch means for coupling said second transmission means to said front axle differential gear, and means for steering said tractor, said steering means including a hydraulic steering pump, the improvement in said power transmission arrangement comprising:

each of said front axle differential gear and differential lock, said four-wheel drive clutch means, at least part of said take-off shaft clutch means and first transmission means, and at least said hydraulic steering pump of said steering means, being situated within said oil sump;

each of said front axle differential gear and differential lock, said four-wheel drive clutch means and said take-off shaft clutch means is hydraulically operated; and a hydraulic control system including means for fluidly coupling each of said differential lock, said four-wheel drive clutch means and said take-off shaft clutch means to said engine lubricant contained in said oil sump so that said engine lubricant operates the same.

2. The combination of claim 1 wherein take-off shaft clutch means is situated completely within said oil sump.

3. The combination of claim 1 wherein said fluid coupling means include a first high pressure side and a second low pressure return side and wherein said four-wheel drive clutch, said differential lock, and said take-off shaft clutch means are coupled to said second low pressure return side of said fluid coupling means of said hydraulic control system for operation by engine lubricant flowing through said return side.

4. The combination of claim 1 wherein said oil sump comprises a load carrying component of a frame of said tractor and wherein said front axle differential gear and differential lock, said four-wheel drive clutch means, said first transmission means and take-off shaft clutch means, and said steering pump are at least partly supported by said oil sump.

5. The combination of claim 1 wherein said oil sump comprises a load carrying component of a frame of said tractor and wherein said front axle differential gear and differential lock, said four-wheel drive clutch means, said first transmission means and take-off shaft clutch means, and said steering pump are entirely supported by said oil sump.

6. The combination of claim 1 wherein said take-off shaft clutch means and said steering pump have a common shaft.

7. The combination of claim 1 wherein said tractor further includes at least one steering cylinder for assisting steering of said front axle and wherein at least one of said steering cylinders is situated within said oil sump and is supported by said oil sump.

* * * * *